UNITED STATES PATENT OFFICE.

WILLIAM GREEN, OF CLEVELAND, OHIO.

IMPROVED CEMENT ROOFING-FABRIC.

*Specification forming part of Letters Patent No.* 55,087, *dated May* 29, 1866; *reissue No.* 3,287, *dated February* 9, 1869.

*To all whom it may concern:*

Be it known that I, WILLIAM GREEN, of Cleveland, in the county of Cuyahoga and State of Ohio, have invented a new and useful Improvement in Sheet-Roofing, the same being a new article of manufacture; and I do hereby declare that the following is a full and complete description thereof and of the mode of compounding or making the same.

This, my invention, which may be styled an improvement in cement or composition roofing, and forms a new article of manufacture, may be used for the roofing of buildings, cars, bridges, steamboats, and various other purposes.

In the manufacture of the article I first take paper of suitable quality or strength, width, and thickness, or other flexible material, which may be put up in roll form, and, reeling off or spreading out the same, cover it with a cement composed of iron ore, reduced to a finely-divided state by any convenient means, but without permitting any chemical change in its particles by heat or otherwise, and mixed with a sufficient quantity of hydrocarbon, linseed, or other oil, to form it into the consistency of soft paste or mortar, which may be put on the paper by hand, trowel, or any suitable means.

After the paper has thus been coated with the cement, composed as described, the same may be subjected to roller-pressure, and, after having been thus prepared and sufficiently pressed, be spread out to dry, and on being well dried be cut up into desirable lengths for transportation. It may be cut up into sections of about the length of shingles or roofing slates, and of any suitable form, and put up in packages containing any desired number of square feet; the object, apart from facilitating transportation, of preparing said roofing in sections of a convenient size for use being to prevent any cracking or breaking of the roofing in handling.

This roofing may be laid like common shingles or slates, or in any of the modes commonly practiced in laying sheet-roofing. In the composition of the cement which is used to cover the paper various suitable mineral or other substances may be introduced, such as sand, pulverized stone, pulverized slate, coal, cinders, &c., for the purpose of giving body and variety of color to the roofing.

What I claim as my invention, and desire to secure by Letters Patent, is—

The herein-described sheet-roofing as a new article of manufacture, made substantially as set forth.

WILLIAM GREEN.

Witnesses:

JAMES J. CAMPBELL,
FRANK P. SHELDON.